(12) United States Patent
Tang et al.

(10) Patent No.: US 9,759,889 B1
(45) Date of Patent: Sep. 12, 2017

(54) OPTICAL IMAGING LENS AND MOBILE DEVICE

(71) Applicant: Genius Electronic Optical Co., Ltd., Taichung (TW)

(72) Inventors: Tzu-Chien Tang, Taichung (TW); Yu-Ming Chen, Taichung (TW)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 0 days.

(21) Appl. No.: 15/159,814

(22) Filed: May 20, 2016

(30) Foreign Application Priority Data

Apr. 27, 2016 (CN) .......................... 2016 1 0268305

(51) Int. Cl.
| | | |
|---|---|---|
| *G02B 13/18* | (2006.01) | |
| *G02B 9/12* | (2006.01) | |
| *G02B 13/00* | (2006.01) | |
| *G02B 7/02* | (2006.01) | |
| *G02B 27/00* | (2006.01) | |
| *H04M 1/02* | (2006.01) | |
| *G02B 5/00* | (2006.01) | |

(52) U.S. Cl.
CPC ......... *G02B 13/0035* (2013.01); *G02B 7/021* (2013.01); *G02B 9/12* (2013.01); *G02B 27/0025* (2013.01); *G02B 5/005* (2013.01); *G02B 13/001* (2013.01); *G02B 13/18* (2013.01); *H04M 1/0264* (2013.01)

(58) Field of Classification Search
CPC ...... G02B 13/0035; G02B 9/12; G02B 13/18; G02B 5/005; G02B 13/001
USPC ................................ 359/716, 739, 784, 791
See application file for complete search history.

(56) References Cited

U.S. PATENT DOCUMENTS

| | | | |
|---|---|---|---|
| 8,537,474 B1 | 9/2013 | Tsai et al. | |
| 8,879,169 B2 | 11/2014 | Hsieh et al. | |
| 9,019,630 B2 | 4/2015 | Tsai et al. | |
| 9,658,431 B1* | 5/2017 | Tang | ................. G02B 13/0035 |
| 2015/0029602 A1* | 1/2015 | Kubota | ............. G02B 13/0035 |
| | | | 359/791 |

FOREIGN PATENT DOCUMENTS

TW  201516457  5/2015

* cited by examiner

*Primary Examiner* — Evelyn A Lester
(74) *Attorney, Agent, or Firm* — Jianq Chyun IP Office

(57) ABSTRACT

An imaging lens includes first, second, and third lens elements arranged in sequence from an object side to an image side along an optical axis. Each lens element has an object-side surface and an image-side surface. The image-side surface of the first lens element has a concave portion in a vicinity of the optical axis and a convex portion in a vicinity of a periphery. The image-side surface of the second lens element has a convex portion in a vicinity of the optical axis and a concave portion in a vicinity of a periphery. The third lens element has negative refracting power. The object-side surface of the third lens element has a concave portion in a vicinity of a periphery. A mobile device is also provided.

20 Claims, 19 Drawing Sheets

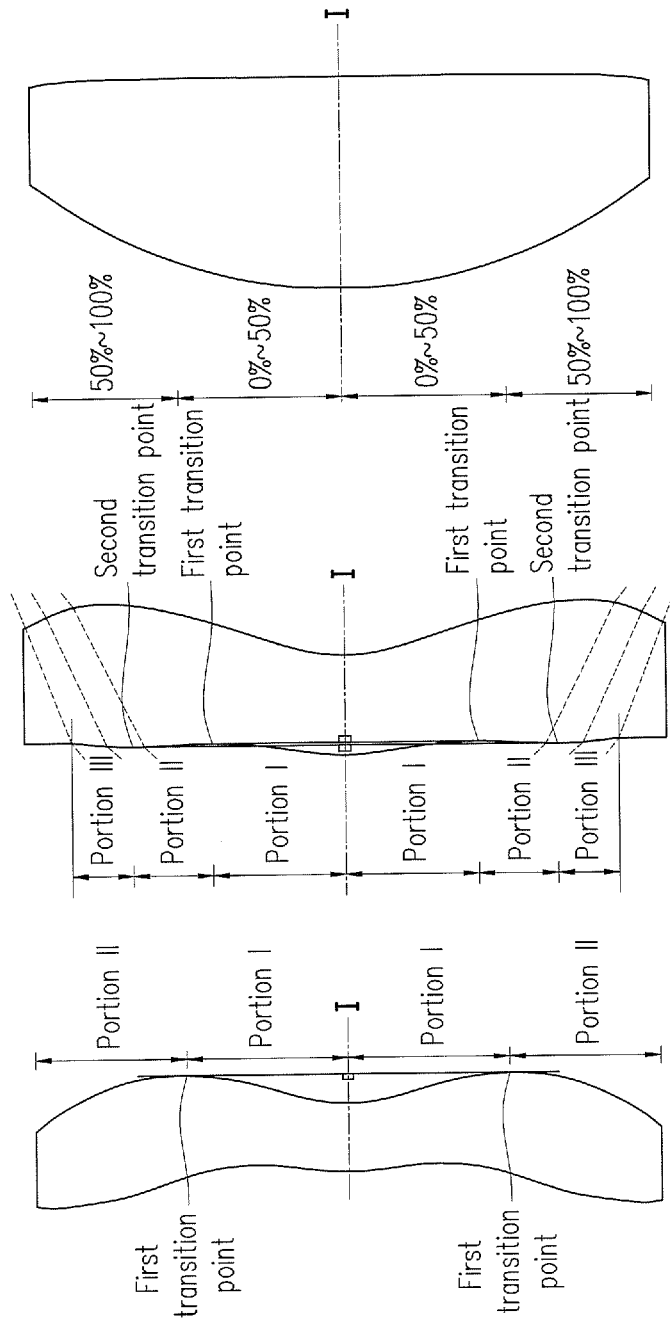

| First embodiment |||||||
|---|---|---|---|---|---|---|
| Effective focal length =2.990 mm , Half field of view (HFOV)=26.758°, Fno =2.2, System length =3.611 mm, Image height =1.542 mm |||||||
| Lens element | Surface | Radius of curvature (mm) | Thickness (mm) | Refractive index | Dispersion coefficient | Focal length (mm) |
| Object | | Infinite | 300 | | | |
| Aperture stop 2 | | Infinite | 0.100 | | | |
| First lens element 3 | Object-side surface 31 | 1.333 | 0.879 | 1.571 | 29.921 | 2.844 |
| | Image-side surface 32 | 5.664 | 0.319 | | | |
| Second lens element 4 | Object-side surface 41 | -6.314 | 0.560 | 1.571 | 29.921 | -77.555 |
| | Image-side surface 42 | -7.602 | 0.319 | | | |
| Third lens element 5 | Object-side surface 51 | 2.657 | 0.726 | 1.571 | 29.921 | -7.345 |
| | Image-side surface 52 | 1.465 | 0.300 | | | |
| Light filter 9 | Object-side surface 91 | Infinite | 0.210 | | | |
| | Image-side surface 92 | Infinite | 0.298 | | | |
| | Image plane 100 | Infinite | | | | |

FIG. 8

| Surface | K | a4 | a6 | a8 | a10 |
|---|---|---|---|---|---|
| 31 | 0.000E+00 | -1.094E-02 | -4.153E-02 | 4.773E-02 | -5.815E-02 |
| 32 | 0.000E+00 | -6.151E-02 | -9.956E-02 | 9.556E-02 | -3.563E-01 |
| 41 | 0.000E+00 | -1.756E-01 | -1.171E-01 | 3.427E-01 | -2.470E-01 |
| 42 | 0.000E+00 | -3.567E-01 | 6.359E-01 | -7.116E-01 | 6.320E-01 |
| 51 | 0.000E+00 | -6.828E-01 | 6.500E-01 | -8.053E-01 | 6.533E-01 |
| 52 | 0.000E+00 | -5.047E-01 | 5.597E-01 | -7.257E-01 | 6.496E-01 |
| Surface | a12 | a14 | a16 | a18 | a20 |
| 31 | 0.000E+00 | 0.000E+00 | 0.000E+00 | 0.000E+00 | 0.000E+00 |
| 32 | 2.278E-01 | 0.000E+00 | 0.000E+00 | 0.000E+00 | 0.000E+00 |
| 41 | -1.321E-01 | 0.000E+00 | 0.000E+00 | 0.000E+00 | 0.000E+00 |
| 42 | 3.247E-01 | -2.809E-01 | 0.000E+00 | 0.000E+00 | 0.000E+00 |
| 51 | -6.414E-02 | -7.397E-02 | 0.000E+00 | 0.000E+00 | 0.000E+00 |
| 52 | -3.720E-01 | 1.199E-01 | -1.680E-02 | 0.000E+00 | 0.000E+00 |

FIG. 9

| Second embodiment |||||||
|---|---|---|---|---|---|---|
| Effective focal length = 2.990 mm , Half field of view (HFOV)=26.570°, Fno =2.6, System length =3.604 mm, Image height =1.542 mm |||||||
| Lens element | Surface | Radius of curvature (mm) | Thickness (mm) | Refractive index | Dispersion coefficient | Focal length (mm) |
| Object | | Infinite | 300 | | | |
| Aperture stop 2 | | Infinite | 0.288 | | | |
| First lens element 3 | Object-side surface 31 | 1.316 | 0.619 | 1.622 | 22.397 | 4.084 |
| | Image-side surface 32 | 2.241 | 0.135 | | | |
| Second lens element 4 | Object-side surface 41 | 80.874 | 0.535 | 1.571 | 29.921 | 16.673 |
| | Image-side surface 42 | -10.765 | 0.462 | | | |
| Third lens element 5 | Object-side surface 51 | 1.673 | 0.646 | 1.571 | 29.921 | -3005.226 |
| | Image-side surface 52 | 1.436 | 0.300 | | | |
| Light filter 9 | Object-side surface 91 | Infinite | 0.210 | | | |
| | Image-side surface 92 | Infinite | 0.698 | | | |
| | Image plane 100 | Infinite | | | | |

FIG. 12

| Surface | K | a4 | a6 | a8 | a10 |
|---|---|---|---|---|---|
| 31 | 0.000E+00 | -1.681E-02 | -3.020E-02 | 4.178E-02 | -6.161E-02 |
| 32 | 0.000E+00 | -8.376E-02 | -1.194E-01 | 8.545E-02 | -3.566E-01 |
| 41 | 0.000E+00 | -1.966E-01 | -5.914E-02 | 3.996E-01 | -2.461E-01 |
| 42 | 0.000E+00 | -3.730E-01 | 7.090E-01 | -7.299E-01 | 6.002E-01 |
| 51 | 0.000E+00 | -7.342E-01 | 1.294E+00 | -3.394E+00 | 5.414E+00 |
| 52 | 0.000E+00 | -4.388E-01 | 3.190E-01 | -2.949E-01 | 1.612E-01 |
| Surface | a12 | a14 | a16 | a18 | a20 |
| 31 | 0.000E+00 | 0.000E+00 | 0.000E+00 | 0.000E+00 | 0.000E+00 |
| 32 | 1.960E-01 | 0.000E+00 | 0.000E+00 | 0.000E+00 | 0.000E+00 |
| 41 | -7.057E-02 | 0.000E+00 | 0.000E+00 | 0.000E+00 | 0.000E+00 |
| 42 | 3.188E-01 | -1.655E-01 | 0.000E+00 | 0.000E+00 | 0.000E+00 |
| 51 | -4.530E+00 | 1.535E+00 | 0.000E+00 | 0.000E+00 | 0.000E+00 |
| 52 | -2.050E-02 | -2.451E-02 | 8.535E-03 | 0.000E+00 | 0.000E+00 |

FIG. 13

| Third embodiment | | | | | | |
|---|---|---|---|---|---|---|
| Effective focal length = 2.990 mm , Half field of view (HFOV)= 26.473°, Fno = 2.2, System length = 3.543 mm, Image height = 1.542 mm | | | | | | |
| Lens element | Surface | Radius of curvature (mm) | Thickness (mm) | Refractive index | Dispersion coefficient | Focal length (mm) |
| Object | | Infinite | 300 | | | |
| Aperture stop 2 | | Infinite | 0.100 | | | |
| First lens element 3 | Object-side surface 31 | 1.234 | 0.696 | 1.571 | 29.921 | 2.897 |
| | Image-side surface 32 | 3.861 | 0.366 | | | |
| Second lens element 4 | Object-side surface 41 | -5.443 | 0.659 | 1.571 | 29.921 | 15.542 |
| | Image-side surface 42 | -3.522 | 0.366 | | | |
| Third lens element 5 | Object-side surface 51 | 3.163 | 0.586 | 1.571 | 29.921 | -4.843 |
| | Image-side surface 52 | 1.376 | 0.300 | | | |
| Light filter 9 | Object-side surface 91 | Infinite | 0.210 | | | |
| | Image-side surface 92 | Infinite | 0.360 | | | |
| | Image plane 100 | Infinite | | | | |

FIG. 16

| Surface | K | a4 | a6 | a8 | a10 |
|---|---|---|---|---|---|
| 31 | 0.000E+00 | -1.157E-02 | -4.292E-02 | 3.968E-02 | -5.194E-02 |
| 32 | 0.000E+00 | -4.683E-02 | -1.070E-01 | 1.107E-01 | -3.271E-01 |
| 41 | 0.000E+00 | -2.121E-01 | -8.894E-02 | 3.756E-01 | -2.606E-01 |
| 42 | 0.000E+00 | -3.961E-01 | 7.557E-01 | -7.346E-01 | 5.595E-01 |
| 51 | 0.000E+00 | -9.353E-01 | 1.021E+00 | -1.049E+00 | 1.144E+00 |
| 52 | 0.000E+00 | -6.767E-01 | 6.533E-01 | -6.378E-01 | 5.048E-01 |
| Surface | a12 | a14 | a16 | a18 | a20 |
| 31 | 0.000E+00 | 0.000E+00 | 0.000E+00 | 0.000E+00 | 0.000E+00 |
| 32 | 1.985E-01 | 0.000E+00 | 0.000E+00 | 0.000E+00 | 0.000E+00 |
| 41 | -9.819E-02 | 0.000E+00 | 0.000E+00 | 0.000E+00 | 0.000E+00 |
| 42 | 3.180E-01 | -1.253E-01 | 0.000E+00 | 0.000E+00 | 0.000E+00 |
| 51 | -6.289E-01 | 1.222E-01 | 0.000E+00 | 0.000E+00 | 0.000E+00 |
| 52 | -3.039E-01 | 1.151E-01 | -2.036E-02 | 0.000E+00 | 0.000E+00 |

FIG. 17

| Fourth embodiment | | | | | | |
|---|---|---|---|---|---|---|
| Effective focal length = 2.990 mm , Half field of view (HFOV)= 27.065°, Fno = 2.4, System length = 3.564 mm, Image height = 1.542 mm | | | | | | |
| Lens element | Surface | Radius of curvature (mm) | Thickness (mm) | Refractive index | Dispersion coefficient | Focal length (mm) |
| Object | | Infinite | 300 | | | |
| Aperture stop 2 | | Infinite | 0.100 | | | |
| First lens element 3 | Object-side surface 31 | 1.330 | 0.697 | 1.596 | 26.651 | 2.954 |
| | Image-side surface 32 | 4.376 | 0.313 | | | |
| Second lens element 4 | Object-side surface 41 | -12.075 | 0.459 | 1.571 | 29.921 | -40.811 |
| | Image-side surface 42 | -25.406 | 0.421 | | | |
| Third lens element 5 | Object-side surface 51 | 2.744 | 0.841 | 1.571 | 29.921 | -11.447 |
| | Image-side surface 52 | 1.717 | 0.300 | | | |
| Light filter 9 | Object-side surface 91 | Infinite | 0.210 | | | |
| | Image-side surface 92 | Infinite | 0.325 | | | |
| | Image plane 100 | Infinite | | | | |

FIG. 20

| Surface | K | a4 | a6 | a8 | a10 |
|---|---|---|---|---|---|
| 31 | 0.000E+00 | -9.893E-03 | -3.611E-02 | 4.209E-02 | -6.614E-02 |
| 32 | 0.000E+00 | -5.072E-02 | -8.971E-02 | 9.778E-02 | -3.445E-01 |
| 41 | 0.000E+00 | -1.916E-01 | -2.583E-02 | 2.255E-01 | -1.306E-01 |
| 42 | 0.000E+00 | -3.325E-01 | 6.299E-01 | -1.036E+00 | 1.749E+00 |
| 51 | 0.000E+00 | -5.499E-01 | 6.611E-01 | -1.493E+00 | 2.043E+00 |
| 52 | 0.000E+00 | -3.623E-01 | 3.179E-01 | -3.347E-01 | 2.289E-01 |
| Surface | a12 | a14 | a16 | a18 | a20 |
| 31 | 0.000E+00 | 0.000E+00 | 0.000E+00 | 0.000E+00 | 0.000E+00 |
| 32 | 2.104E-01 | 0.000E+00 | 0.000E+00 | 0.000E+00 | 0.000E+00 |
| 41 | -6.688E-02 | 0.000E+00 | 0.000E+00 | 0.000E+00 | 0.000E+00 |
| 42 | -1.414E+00 | 7.087E-01 | 0.000E+00 | 0.000E+00 | 0.000E+00 |
| 51 | -1.527E+00 | 4.883E-01 | 0.000E+00 | 0.000E+00 | 0.000E+00 |
| 52 | -9.920E-02 | 2.435E-02 | -2.642E-03 | 0.000E+00 | 0.000E+00 |

FIG. 21

| Fifth embodiment | | | | | | |
|---|---|---|---|---|---|---|
| Effective focal length = 2.990 mm, Half field of view (HFOV)= 26.707°, Fno = 2.5, System length = 3.508 mm, Image height = 1.542 mm | | | | | | |
| Lens element | Surface | Radius of curvature (mm) | Thickness (mm) | Refractive index | Dispersion coefficient | Focal length (mm) |
| Object | | Infinite | 300 | | | |
| Aperture stop 2 | | Infinite | 0.100 | | | |
| First lens element 3 | Object-side surface 31 | 1.294 | 0.830 | 1.614 | 23.189 | 2.607 |
| | Image-side surface 32 | 5.117 | 0.307 | | | |
| Second lens element 4 | Object-side surface 41 | -3.733 | 0.623 | 1.571 | 29.921 | -41.915 |
| | Image-side surface 42 | -4.691 | 0.317 | | | |
| Third lens element 5 | Object-side surface 51 | 2.815 | 0.616 | 1.571 | 29.921 | -5.803 |
| | Image-side surface 52 | 1.401 | 0.300 | | | |
| Light filter 9 | Object-side surface 91 | Infinite | 0.210 | | | |
| | Image-side surface 92 | Infinite | 0.306 | | | |
| | Image plane 100 | Infinite | | | | |

FIG. 24

| Surface | K | a4 | a6 | a8 | a10 |
|---|---|---|---|---|---|
| 31 | 0.000E+00 | -9.809E-03 | -3.075E-02 | 4.943E-02 | -6.609E-02 |
| 32 | 0.000E+00 | -5.326E-02 | -1.195E-01 | 7.319E-02 | -3.711E-01 |
| 41 | 0.000E+00 | -1.792E-01 | -1.034E-01 | 2.845E-01 | -3.671E-01 |
| 42 | 0.000E+00 | -3.666E-01 | 7.528E-01 | -7.314E-01 | 5.543E-01 |
| 51 | 0.000E+00 | -7.609E-01 | 1.923E-01 | 1.228E+00 | -2.785E+00 |
| 52 | 0.000E+00 | -6.333E-01 | 6.413E-01 | -7.586E-01 | 7.035E-01 |
| Surface | a12 | a14 | a16 | a18 | a20 |
| 31 | 0.000E+00 | 0.000E+00 | 0.000E+00 | 0.000E+00 | 0.000E+00 |
| 32 | 1.750E-01 | 0.000E+00 | 0.000E+00 | 0.000E+00 | 0.000E+00 |
| 41 | -2.861E-01 | 0.000E+00 | 0.000E+00 | 0.000E+00 | 0.000E+00 |
| 42 | 3.054E-01 | -1.188E-01 | 0.000E+00 | 0.000E+00 | 0.000E+00 |
| 51 | 2.638E+00 | -8.698E-01 | 0.000E+00 | 0.000E+00 | 0.000E+00 |
| 52 | -4.553E-01 | 1.699E-01 | -2.760E-02 | 0.000E+00 | 0.000E+00 |

FIG. 25

| Sixth embodiment |||||||
|---|---|---|---|---|---|---|
| Effective focal length = 2.990 mm , Half field of view (HFOV)= 26.719°, Fno = 2.5, System length = 3.491 mm, Image height = 1.542 mm |||||||
| Lens element | Surface | Radius of curvature (mm) | Thickness (mm) | Refractive index | Dispersion coefficient | Focal length (mm) |
| Object | | Infinite | 300 | | | |
| Aperture stop 2 | | Infinite | 0.100 | | | |
| First lens element 3 | Object-side surface 31 | 1.224 | 0.596 | 1.571 | 29.921 | 2.954 |
| | Image-side surface 32 | 3.673 | 0.402 | | | |
| Second lens element 4 | Object-side surface 41 | -5.393 | 0.669 | 1.571 | 29.921 | 11.100 |
| | Image-side surface 42 | -3.045 | 0.403 | | | |
| Third lens element 5 | Object-side surface 51 | 3.171 | 0.510 | 1.571 | 29.921 | -4.743 |
| | Image-side surface 52 | 1.375 | 0.300 | | | |
| Light filter 9 | Object-side surface 91 | Infinite | 0.210 | | | |
| | Image-side surface 92 | Infinite | 0.401 | | | |
| | Image plane 100 | Infinite | | | | |

FIG. 28

| Surface | K | a4 | a6 | a8 | a10 |
|---|---|---|---|---|---|
| 31 | 0.000E+00 | -1.267E-02 | -4.466E-02 | 3.789E-02 | -5.382E-02 |
| 32 | 0.000E+00 | -4.555E-02 | -1.059E-01 | 1.113E-01 | -3.266E-01 |
| 41 | 0.000E+00 | -2.119E-01 | -8.736E-02 | 3.759E-01 | -2.596E-01 |
| 42 | 0.000E+00 | -3.796E-01 | 7.474E-01 | -7.482E-01 | 5.490E-01 |
| 51 | 0.000E+00 | -9.402E-01 | 1.020E+00 | -1.055E+00 | 1.159E+00 |
| 52 | 0.000E+00 | -6.952E-01 | 6.424E-01 | -5.066E-01 | 2.466E-01 |
| Surface | a12 | a14 | a16 | a18 | a20 |
| 31 | 0.000E+00 | 0.000E+00 | 0.000E+00 | 0.000E+00 | 0.000E+00 |
| 32 | 1.990E-01 | 0.000E+00 | 0.000E+00 | 0.000E+00 | 0.000E+00 |
| 41 | -9.824E-02 | 0.000E+00 | 0.000E+00 | 0.000E+00 | 0.000E+00 |
| 42 | 3.137E-01 | -1.247E-01 | 0.000E+00 | 0.000E+00 | 0.000E+00 |
| 51 | -6.458E-01 | 1.291E-01 | 0.000E+00 | 0.000E+00 | 0.000E+00 |
| 52 | -6.402E-02 | 6.118E-03 | -8.235E-04 | 0.000E+00 | 0.000E+00 |

FIG. 29

| Seventh embodiment |||||||
|---|---|---|---|---|---|---|
| Effective focal length = 2.990 mm, Half field of view (HFOV)= 26.395°, Fno = 2.2, System length = 3.593 mm, Image height =1.542 mm |||||||
| Lens element | Surface | Radius of curvature (mm) | Thickness (mm) | Refractive index | Dispersion coefficient | Focal length (mm) |
| Object | | Infinite | 300 | | | |
| Aperture stop 2 | | Infinite | 0.100 | | | |
| First lens element 3 | Object-side surface 31 | 1.208 | 0.583 | 1.571 | 29.921 | 3.004 |
| | Image-side surface 32 | 3.364 | 0.361 | | | |
| Second lens element 4 | Object-side surface 41 | -5.746 | 0.709 | 1.571 | 29.921 | 13.047 |
| | Image-side surface 42 | -3.390 | 0.441 | | | |
| Third lens element 5 | Object-side surface 51 | 3.147 | 0.627 | 1.571 | 29.921 | -4.895 |
| | Image-side surface 52 | 1.373 | 0.300 | | | |
| Light filter 9 | Object-side surface 91 | Infinite | 0.210 | | | |
| | Image-side surface 92 | Infinite | 0.362 | | | |
| | Image plane 100 | Infinite | | | | |

FIG. 32

| Surface | K | a4 | a6 | a8 | a10 |
|---|---|---|---|---|---|
| 31 | 0.000E+00 | -8.530E-03 | -3.787E-02 | 3.948E-02 | -5.236E-02 |
| 32 | 0.000E+00 | -4.113E-02 | -1.070E-01 | 1.110E-01 | -3.266E-01 |
| 41 | 0.000E+00 | -2.116E-01 | -1.255E-01 | 3.830E-01 | -2.332E-01 |
| 42 | 0.000E+00 | -3.652E-01 | 7.068E-01 | -7.539E-01 | 4.919E-01 |
| 51 | 0.000E+00 | -8.971E-01 | 9.813E-01 | -1.137E+00 | 1.266E+00 |
| 52 | 0.000E+00 | -5.804E-01 | 3.661E-01 | -1.910E-01 | 7.964E-02 |
| Surface | a12 | a14 | a16 | a18 | a20 |
| 31 | 0.000E+00 | 0.000E+00 | 0.000E+00 | 0.000E+00 | 0.000E+00 |
| 32 | 1.991E-01 | 0.000E+00 | 0.000E+00 | 0.000E+00 | 0.000E+00 |
| 41 | -7.681E-02 | 0.000E+00 | 0.000E+00 | 0.000E+00 | 0.000E+00 |
| 42 | 3.209E-01 | -2.436E-02 | 0.000E+00 | 0.000E+00 | 0.000E+00 |
| 51 | -6.789E-01 | 1.296E-01 | 0.000E+00 | 0.000E+00 | 0.000E+00 |
| 52 | -6.070E-02 | 3.952E-02 | -1.057E-02 | 0.000E+00 | 0.000E+00 |

FIG. 33

| Conditional expression | Range lower limit | Range upper limit | First embodiment | Second embodiment | Third embodiment | Fourth embodiment | Fifth embodiment | Sixth embodiment | Seventh embodiment |
|---|---|---|---|---|---|---|---|---|---|
| TA | | | 0.100 | 0.288 | 0.100 | 0.100 | 0.100 | 0.100 | 0.100 |
| T1 | | | 0.879 | 0.619 | 0.696 | 0.697 | 0.830 | 0.596 | 0.583 |
| G1 | | | 0.319 | 0.135 | 0.366 | 0.313 | 0.307 | 0.402 | 0.361 |
| T2 | | | 0.560 | 0.535 | 0.659 | 0.459 | 0.623 | 0.669 | 0.709 |
| G2 | | | 0.319 | 0.462 | 0.366 | 0.421 | 0.317 | 0.403 | 0.441 |
| T3 | | | 0.726 | 0.646 | 0.586 | 0.841 | 0.616 | 0.510 | 0.627 |
| G3F | | | 0.300 | 0.300 | 0.300 | 0.300 | 0.300 | 0.300 | 0.300 |
| TF | | | 0.210 | 0.210 | 0.210 | 0.210 | 0.210 | 0.210 | 0.210 |
| GFP | | | 0.298 | 0.698 | 0.360 | 0.325 | 0.306 | 0.401 | 0.362 |
| $\upsilon 1$ | | 35.00 | 29.921 | 22.397 | 29.921 | 26.651 | 23.189 | 29.921 | 29.921 |
| EFL | | | 2.990 | 2.990 | 2.990 | 2.990 | 2.990 | 2.990 | 2.990 |
| TL | | | 2.803 | 2.397 | 2.673 | 2.730 | 2.692 | 2.580 | 2.722 |
| BFL | | | 0.808 | 1.208 | 0.870 | 0.834 | 0.816 | 0.911 | 0.872 |
| ALT | | | 2.164 | 1.800 | 1.941 | 1.997 | 2.069 | 1.776 | 1.919 |
| Gaa | | | 0.639 | 0.596 | 0.732 | 0.733 | 0.623 | 0.805 | 0.802 |
| Gaa/G2 | 1.00 | 2.00 | 2.000 | 1.292 | 2.000 | 1.743 | 1.969 | 1.999 | 1.818 |
| EFL/(T2+G2) | 2.50 | 3.40 | 3.400 | 3.001 | 2.917 | 3.400 | 3.182 | 2.789 | 2.599 |
| BFL/T2 | 1.00 | 3.70 | 1.443 | 2.259 | 1.320 | 1.819 | 1.310 | 1.361 | 1.229 |
| (T1+T3)/Gaa | 1.35 | 3.00 | 2.512 | 2.122 | 1.750 | 2.097 | 2.319 | 1.375 | 1.508 |
| BFL/T1 | 0.50 | 2.00 | 0.920 | 1.950 | 1.251 | 1.197 | 0.984 | 1.528 | 1.496 |
| (T2+G1)/G2 | 1.40 | 3.00 | 2.754 | 1.450 | 2.800 | 1.834 | 2.937 | 2.662 | 2.426 |
| T3/G2 | 1.25 | 2.50 | 2.272 | 1.400 | 1.600 | 1.999 | 1.946 | 1.267 | 1.422 |
| (T1+T3)/G2 | 2.70 | 5.50 | 5.024 | 5.024 | 3.500 | 3.853 | 3.498 | 2.748 | 2.742 |
| T2/G2 | 1.00 | 2.00 | 1.754 | 1.158 | 1.800 | 1.091 | 1.968 | 1.663 | 1.607 |
| TL/Gaa | 3.20 | 4.50 | 4.389 | 4.019 | 3.650 | 3.657 | 3.649 | 3.207 | 3.392 |
| (T1+T3)/G1 | 2.70 | 9.50 | 5.024 | 9.396 | 3.500 | 4.920 | 4.712 | 2.751 | 3.350 |
| ALT/Gaa | 2.20 | 3.50 | 3.389 | 3.019 | 2.650 | 2.723 | 3.318 | 2.207 | 2.392 |
| TL/T2 | 3.50 | 6.00 | 5.005 | 4.483 | 4.056 | 5.599 | 4.056 | 3.854 | 3.837 |
| T1/G2 | 1.30 | 3.00 | 2.751 | 1.342 | 1.900 | 1.656 | 2.620 | 1.480 | 1.320 |
| (G1+T1)/T2 | 1.00 | 2.20 | 2.139 | 1.410 | 1.611 | 2.200 | 1.824 | 1.491 | 1.330 |
| (T2+T1)/Gaa | 1.55 | 2.50 | 2.253 | 1.935 | 1.850 | 1.576 | 2.330 | 1.573 | 1.610 |
| (T2+T1)/G2 | 2.50 | 5.00 | 4.505 | 2.500 | 3.700 | 3.095 | 3.697 | 3.143 | 2.927 |

FIG. 34

OPTICAL IMAGING LENS AND MOBILE DEVICE

CROSS-REFERENCE TO RELATED APPLICATION

This application claims the priority benefit of China application serial no. 201610268305.X, filed on Apr. 27, 2016. The entirety of the above-mentioned patent application is hereby incorporated by reference herein and made a part of this specification.

BACKGROUND OF THE INVENTION

Field of the Invention

The invention relates to an optical lens and an electronic device, and particularly relates to an optical imaging lens and a mobile device.

Description of Related Art

In recent years, along with wide use of mobile electronic products such as mobile phones, digital cameras, etc., techniques related to image module are quickly developed, and the image module mainly includes components such as an optical imaging lens, a module holder unit, a sensor, etc., and a thinning and lightweight trend of the mobile phones and the digital cameras increases a miniaturization demand of the image module. Along with technology improvement and size reduction of charge coupled devices (CCD) and complementary metal oxide semiconductors (CMOS), a length of the optical imaging lens installed in the image module is also required to be correspondingly shortened. However, in order to avoid decline of image capturing effect and image capturing quality, when the length of the optical imaging lens is shortened, the good optical performance has to be taken into consideration. The most important characteristics of the optical imaging lens are imaging quality and a volume thereof.

Specifications of the mobile electronic products (for example, mobile phones, cameras, tablet personal computers, personal digital assistants, vehicle camera device, etc.) change rapidly, and optical lens sets serving as key components thereof are also developed in diversified ways. Applications of the optical lens sets not only include image capturing and video recording, but also include environment monitoring, driving data recording, etc., and along with progress of image sensing technology, consumers have higher demand on imaging quality. Therefore, the design of the optical lens group not only requires to achieve good imaging quality and a smaller lens space, but also has to consider improvement of field of view and the size of an aperture due to a dynamic and light inadequate environment.

However, regarding the design of the optical imaging lens, in order to fabricate the optical imaging lens with both characteristics of good imaging quality and miniaturization, it is not enough to purely scale down the lenses with good imaging quality, and a material property is also involved, and practical problems in production such as an assembling yield, etc., are also considered.

A technical difficulty for fabricating the miniaturized lens is obviously higher than that of the conventional lens, so that it is still a target of the industry, government and academia to produce the optical imaging lens complied with demands of consumer electronics, and keep improving the imaging quality thereof.

Moreover, regarding a three-piece lens structure, in the conventional optical imaging lens, a distance between an object-side surface of a first lens element and an image plane on an optical axis is too large, which is of no avail for thinning the mobile phones and digital cameras.

SUMMARY OF THE INVENTION

The invention is directed to an optical imaging lens, which still maintains good optical performance in case that a system length of the optical imaging lens is shortened.

An embodiment of the invention provides an optical imaging lens including a first lens element, a second lens element and a third lens element arranged in a sequence from an object side to an image side along an optical axis. Each of the first lens element to the third lens element has an object-side surface facing the object side and pervious to an imaging ray and an image-side surface facing the image side and pervious to the imaging ray. The image-side surface of the first lens element has a concave portion in a vicinity of the optical axis and a convex portion in a vicinity of a periphery. The image-side surface of the second lens element has a convex portion in a vicinity of the optical axis and a concave portion in a vicinity of a periphery. The third lens element has a negative refracting power. The object-side surface of the third lens element has a concave portion in a vicinity of a periphery. The number of lens elements in optical imaging lens having refracting power is only three, and the optical imaging lens is complied with $Gaa/G2 \leq 2$ and $EFL/(T2+G2) \leq 3.4$, where $Gaa$ is a sum of two air gaps on the optical axis from the first lens element to the third lens element, $G2$ is an air gap on the optical axis from the second lens element to the third lens element, $EFL$ is an effective focal length of the optical imaging lens, and $T2$ is a thickness of the second lens element on the optical axis.

An embodiment of the invention provides a mobile device including a casing and an image module. The image module is installed in the casing, and includes the aforementioned optical imaging lens, a lens barrel, a module holder unit and an image sensor. The lens barrel is used for accommodating the optical imaging lens, the module holder unit holds the lens barrel, and the image sensor is disposed at the image side of the optical imaging lens.

According to the above descriptions, advantageous effects of the optical imaging lens and the mobile device according to the embodiments of the invention are as follows. Based on the design and arrangement of the concave and convex shapes of the object-side surface or the image-side surface of the lens elements, the optical imaging lens still has an optical performance capable of effectively overcoming aberration and is capable of providing good imaging quality in case that the system length of the optical imaging lens is shortened.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic diagram illustrating a surface shape structure of a lens of a first example.

FIG. 4 is a schematic diagram illustrating a surface shape structure of a lens of a second example.

FIG. 5 is a schematic diagram illustrating a surface shape structure of a lens of a third example.

FIG. 8 shows detailed optical data of the optical imaging lens of the first embodiment.

FIG. 9 shows aspheric parameters of the optical imaging lens of the first embodiment.

FIG. 12 shows detailed optical data of the optical imaging lens of the second embodiment.

FIG. 13 shows aspheric parameters of the optical imaging lens of the second embodiment.

FIG. 16 shows detailed optical data of the optical imaging lens of the third embodiment.

FIG. 17 shows aspheric parameters of the optical imaging lens of the third embodiment.

FIG. 20 shows detailed optical data of the optical imaging lens of the fourth embodiment.

FIG. 21 shows aspheric parameters of the optical imaging lens of the fourth embodiment.

FIG. 24 shows detailed optical data of the optical imaging lens of the fifth embodiment.

FIG. 25 shows aspheric parameters of the optical imaging lens of the fifth embodiment.

FIG. 28 shows detailed optical data of the optical imaging lens of the sixth embodiment.

FIG. 29 shows aspheric parameters of the optical imaging lens of the sixth embodiment.

FIG. 32 shows detailed optical data of the optical imaging lens of the seventh embodiment.

FIG. 33 shows aspheric parameters of the optical imaging lens of the seventh embodiment.

FIG. 34 is a table diagram of various important parameters and expressions of the optical imaging lenses of the first to the seventh embodiments of the invention.

DESCRIPTION OF EMBODIMENTS

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figure 1:
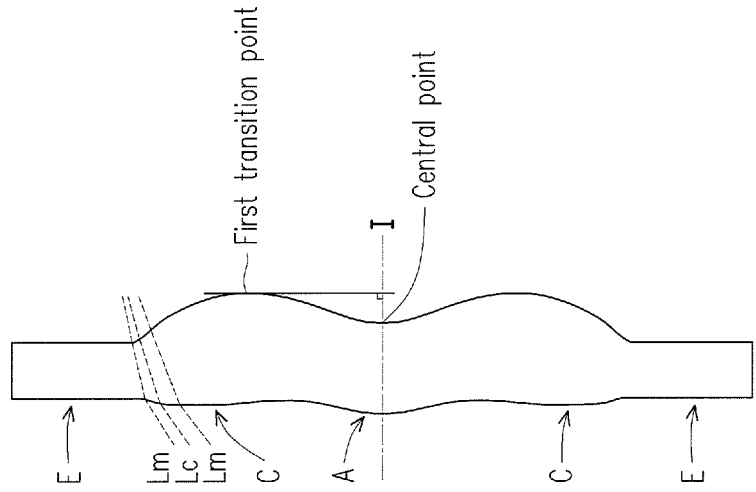
FIG. 1 is a schematic diagram illustrating a surface shape structure of a lens.

1. FIG. 1 is a radial cross-sectional view of a lens element. Before determining boundaries of those aforesaid portions, two referential points should be defined first, central point and transition point. The central point of a surface of a lens element is defined as a point of intersection of that surface and the optical axis. The transition point is defined as a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Figure 2:
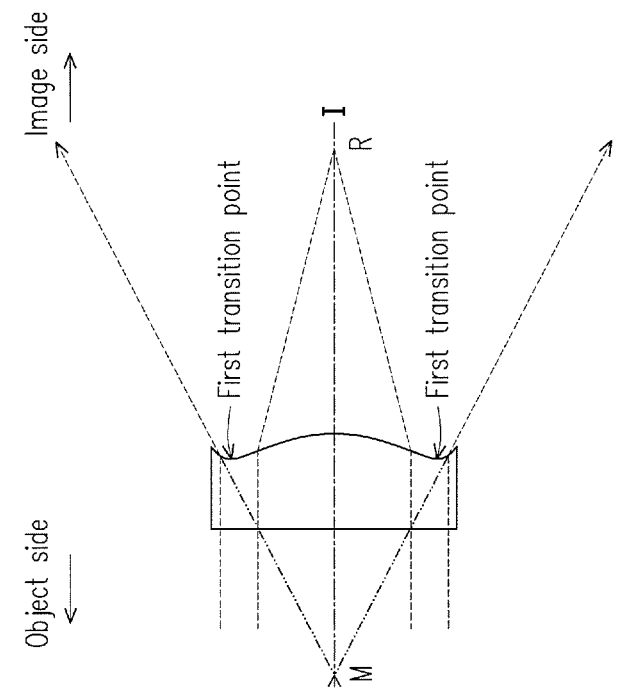
FIG. 2 is a schematic diagram illustrating surface shape concave and convex structures and a light focal point.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of the effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to that the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because that the R value at the object-side surface of the lens element is positive. The portion in a vicinity of a periphery of the lens element (portion III) has a convex shape. What is more, there is another portion having a concave shape existing between the first and second transition points (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 6:
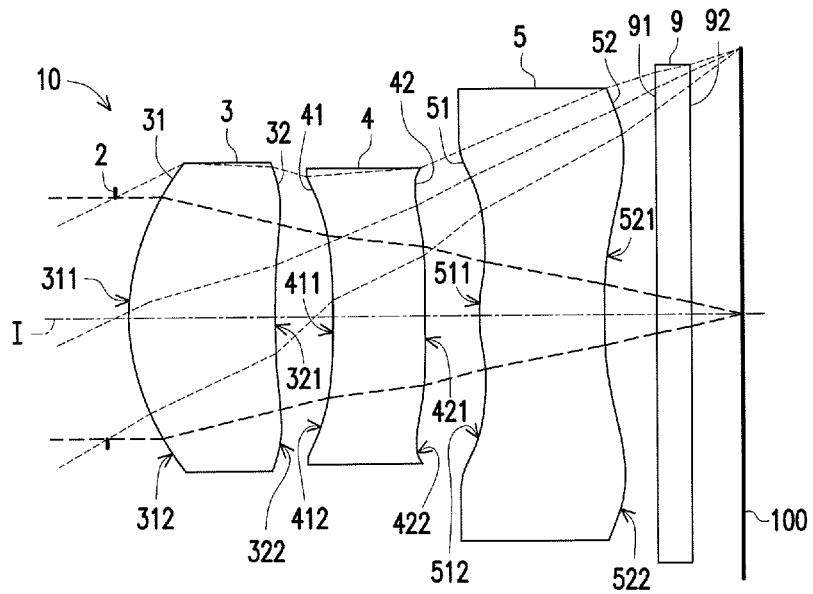
FIG. 6 is a schematic diagram of an optical imaging lens of a first embodiment of the invention.

FIG. 6 is a schematic diagram of an optical imaging lens according to a first embodiment of the invention, and FIG. 7A-FIG. 7D are diagrams of a longitudinal spherical aberration and various aberrations of the optical imaging lens of the first embodiment. Referring to FIG. 6, the optical imaging lens 10 of the first embodiment of the invention sequentially includes an aperture stop 2, a first lens element 3, a second lens element 4, a third lens element 5 and a light filter 9 arranged in a sequence from an object side to an image side along an optical axis I. When a light emitted by an object to be captured enters the optical imaging lens 10, after the light passes through the aperture stop 2, the first lens element 3, the second lens element 4, the third lens element 5 and the light filter 9, an image is formed on an image plane 100. The light filter 9 is, for example, an infrared (IR) cut filter, which is used for preventing an IR ray in a part of the IR band in the light from being transmitted to the image plane 100 to influence imaging quality. It should be noted that the object side is a side facing the object to be captured, and the image side is a side facing the image plane 100.

The first lens element 3, the second lens element 4, the third lens element 5 and the light filter 9 respectively have object-side surfaces 31, 41, 51, 91 facing toward the object side and pervious to an imaging ray and image-side surfaces 32, 42, 52, 92 facing toward the image side and pervious to the imaging ray.

Moreover, in order to satisfy a product demand of lightweight, the first lens element 3 to the third lens element 5 all have refracting power and are all made of plastic materials, though the materials of the first lens element 3 to the third lens element 5 are not limited thereto.

The first lens element 3 has positive refracting power, the object-side surface 31 of the first lens element 3 is a convex surface, and has a convex portion 311 in a vicinity of the optical axis I and a convex portion 312 in a vicinity of periphery of the first lens element 3. The image-side surface 32 of the first lens element 3 has a concave portion 321 in a vicinity of the optical axis I and a convex portion 322 in a vicinity of a periphery of the first lens element 3. In the present embodiment, the object-side surface 31 and the image-side surface 32 of the first lens element 3 are both aspheric surfaces.

The second lens element 4 has negative refracting power, the object-side surface 41 of the second lens element 4 is a concave surface, and has a concave portion 411 in a vicinity of the optical axis I and a concave portion 412 in a vicinity of a periphery of the second lens element 4. The image-side surface 42 of the second lens element 4 has a convex portion 421 in a vicinity of the optical axis I and a concave portion 422 in a vicinity of a periphery of the second lens element 4. In the present embodiment, the object-side surface 41 and the image-side surface 42 of the second lens element 4 are both aspheric surfaces.

The third lens element 5 has negative refracting power, the object-side surface 51 of the third lens element 5 has a convex portion 511 in a vicinity of the optical axis I and a concave portion 512 in a vicinity of a periphery of the third lens element 5. The image-side surface 52 of the third lens element 5 has a concave portion 521 in a vicinity of the optical axis I and a convex portion 522 in a vicinity of a periphery of the third lens element 5. In the present embodiment, the object-side surface 51 and the image-side surface 52 of the third lens element 5 are both aspheric surfaces.

In the first embodiment, only the aforementioned lens elements have refracting power, and the number of lens elements having refracting power is only three.

Other detailed optical data of the first embodiment is shown in FIG. 8, and an effective focal length (EFL) of the whole system of the first embodiment is 2.990 mm, a half field of view (HFOV) thereof is 26.758°, an f-number (Fno) thereof is 2.2, a system length thereof is 3.611 mm, and an image height thereof is 1.542 mm. The system length refers to a distance between the object-side surface 31 of the first lens element 3 and the image plane 100 on the optical axis I.

Moreover, totally 6 surfaces of the object-side surfaces 31, 41 and 51 and the image-side surfaces 32, 42 and 52 of the first lens element 3, the second lens element 4 and the third lens element 5 are all aspheric surfaces in this embodiment, and the aspheric surfaces are defined by the following equations:

$$Z(Y) = \frac{Y^2}{R} \bigg/ \left(1 + \sqrt{1-(1+K)\frac{Y^2}{R^2}}\right) + \sum_{i=1}^{n} a_i \times Y^i \qquad (1)$$

Where:

Y: a distance between a point on an aspheric curve and the optical axis I;

Z: a depth of the aspheric surface (a perpendicular distance between the point on the aspheric surface that is spaced by the distance Y from the optical axis I and a tangent plane tangent to a vertex of the aspheric surface on the optical axis I);

R: a radius of curvature of the surface of the lens element close to the optical axis I;

K: a conic constant;

$a_i$: $i^{th}$ aspheric coefficient.

Various aspheric coefficients of the object-side surface 31 of the first lens element 3 to the image-side surface 52 of the third lens element 5 in the equation (1) are shown in FIG. 9. In FIG. 9, a field referential number 31 represents the aspheric coefficients of the object-side surface 31 of the first lens element 3, and the other fields are deduced by analogy.

Moreover, relationships between various important parameters of the optical imaging lens 10 of the first embodiment are shown in FIG. 34.

Where,

T1 is a thickness of the first lens element 3 on the optical axis I;

T2 is a thickness of the second lens element 4 on the optical axis I;

T3 is a thickness of the third lens element 5 on the optical axis I;

TF is a thickness of the light filter 9 on the optical axis I;

G1 is a distance between the image-side surface 32 of the first lens element 3 and the object-side surface 41 of the second lens element 4 on the optical axis I;

G2 is a distance between the image-side surface 42 of the second lens element 4 and the object-side surface 51 of the third lens element 5 on the optical axis I;

G3F is a distance between the image-side surface 52 of the third lens element 5 and the object-side surface 91 of the light filter 9 on the optical axis I;

GPF is a distance between the image-side surface 92 of the light filter 9 and the image plane 100 on the optical axis I;

Gaa is a sum of two air gaps among the first lens element 3 to the third lens element 6 on the optical axis I, i.e. a sum of G1 and G2;

ALT is a sum of the thickness of the first lens element 3, the second lens element 4 and the third lens element 5 on the optical axis I, i.e. a sum of T1, T2 and T3;

TTL is a distance between the object-side surface 31 of the first lens element 3 and the image plane 100 on the optical axis I;

TL is a distance between the object-side surface 31 of the first lens element 3 and the image-side surface 52 of the third lens element 5 on the optical axis I;

BFL is a distance between the image-side surface 52 of the third lens element 5 and the image plane 100 on the optical axis I;

EFL is an effective focal length of the optical imaging lens 10; and

TA is a distance between the aperture stop 2 and the object-side surface of a next adjacent lens element (for example, the object-side surface 31 of the first lens element 3 in the present embodiment) on the optical axis I.

Figures 7A, 7B, 7C, 7D:
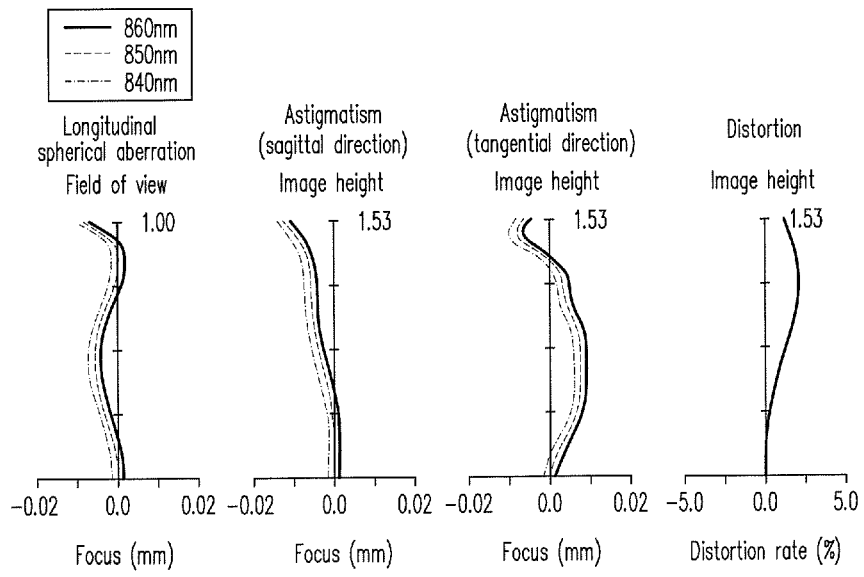
FIG. 7A-FIG. 7D are diagrams of a longitudinal spherical aberration and various aberrations of the optical imaging lens of the first embodiment.

Moreover, it is further defined that:

GFP is an air gap between the light filter 9 and the image plane 100 on the optical axis I;

f1 is a focal length of the first lens element 3;

f2 is a focal length of the second lens element 4;

f3 is a focal length of the third lens element 5;

n1 is a refractive index of the first lens element 3;

n2 is a refractive index of the second lens element 4;

n3 is a refractive index of the third lens element 5;

υ1 is an Abbe number of the first lens element 3, where the Abbe number can also be referred to as a dispersion coefficient;

υ2 is an Abbe number of the second lens element 4;

υ3 is an Abbe number of the third lens element 5;

Referring to FIG. 7A to FIG. 7D, FIG. 7A illustrates a longitudinal spherical aberration of the first embodiment, FIG. 7B and FIG. 7C respectively illustrate an astigmatism aberration in a sagittal direction on the image plane 100 and an astigmatism aberration in a tangential direction on the image plane 100, and FIG. 7D illustrates a distortion aberration on the image plane 100 of the first embodiment. In the diagram of the longitudinal spherical aberration of the first embodiment of FIG. 7A, curves formed by each wavelength are close to each other and are gathered in the middle, which represents that off-axis lights of different heights of each wavelength are gathered around imaging points, and according to a deviation range of the curve of each wavelength, it is learned that deviations of the imaging points of the off-axis lights of different heights are controlled within a range of ±0.01 mm, so that the spherical aberration of the same wavelength is obviously ameliorated. Moreover, the distances between the three representative wavelengths are rather close, which represents that imaging positions of the lights with different wavelengths are rather close, so that a chromatic aberration is obviously ameliorated.

In the diagrams of the two astigmatism aberrations of FIG. 7B and FIG. 7C, a focal length variation of the three representative wavelengths in the whole field of view falls within ±0.015 mm, which represents that the optical system of the first embodiment may effectively eliminate the aberration. The diagram of the distortion aberration of FIG. 7D shows that the distortion aberration of the first embodiment is maintained within a range of ±2.5%, which represents that the distortion aberration of the first embodiment is complied with an imaging quality requirement of the optical system. Compared to the existing optical lenses, the imaging lens of the first embodiment of the invention may still provide good imaging quality under a condition that the system length is reduced to about 3.611 mm. Therefore, under the condition of maintaining a good optical performance, the lens length is reduced and a capturing angle is expanded to implement product designs of thinning tendency and an enlarged field of view (FOV).

Figure 10:
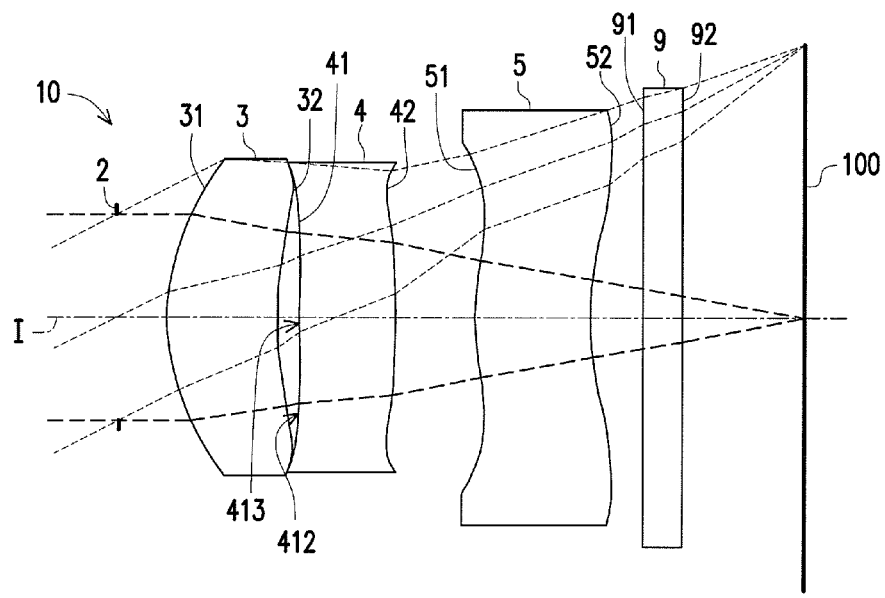
FIG. 10 is a schematic diagram of an optical imaging lens of a second embodiment of the invention.

FIG. 10 is a schematic diagram of an optical imaging lens according to a second embodiment of the invention, and FIG. 11A to FIG. 11D are diagrams illustrating longitudinal spherical aberrations and various aberrations of the optical imaging lens of the second embodiment. Referring to FIG. 10, which is a second embodiment of the optical imaging lens 10 of the invention, where the second embodiment is similar to the first embodiment, and only optical data, aspheric coefficients and parameters among the lens elements 3, 4 and 5 are somewhat different, and the second lens element 4 has positive refracting power, and the object-side surface 41 of the second lens element 4 has a convex portion 413 in a vicinity of the optical axis I and a concave portion 412 in a vicinity of a periphery of the lens element 4. It should be noted that in order to clearly display the figure, a part of the referential numbers of the concave portions and the convex portions that are the same as those of the first embodiment are omitted in FIG. 10.

Detailed optical data of the optical imaging lens 10 is shown in FIG. 12, and an EFL of the whole system of the second embodiment is 2.990 mm, an HFOV thereof is 26.570°, an Fno thereof is 2.6, a system length thereof is 3.604 mm, and an image height thereof is 1.542 mm.

FIG. 13 illustrates various aspheric coefficients of the object-side surface 31 of the first lens element 3 to the image-side surface 52 of the third lens element 5 in the equation (1) in the second embodiment.

Moreover, relationships between various important parameters of the optical imaging lens 10 of the second embodiment are shown in FIG. 34.

Figures 11A, 11B, 11C, 11D:
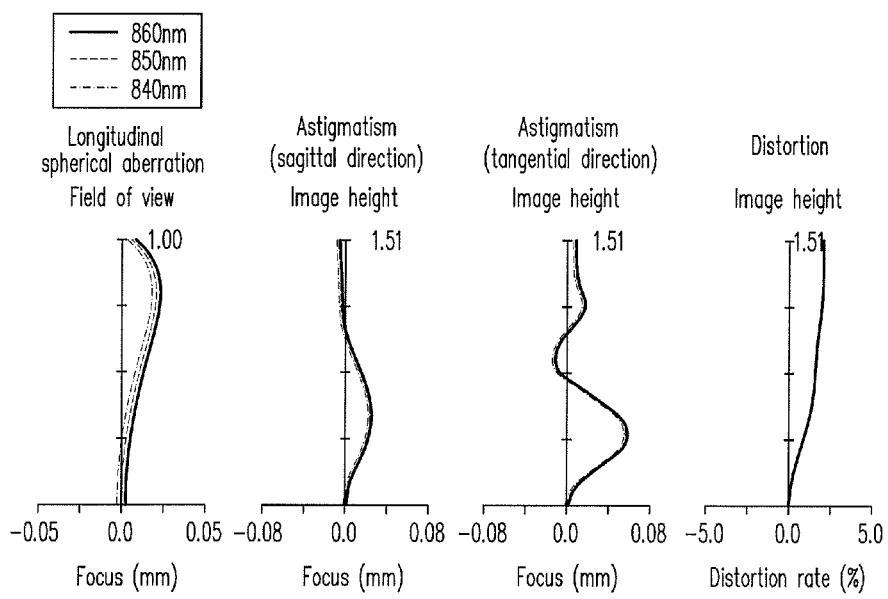
FIG. 11A-FIG. 11D are diagrams of a longitudinal spherical aberration and various aberrations of the optical imaging lens of the second embodiment.

According to the longitudinal spherical aberration diagram of FIG. 11A of the second embodiment, a deviation of the imaging points of the off-axis lights of different heights is controlled within a range of ±0.025 mm. According to the two astigmatism aberration diagrams of FIG. 11B and FIG. 11C, a focal length variation of the three representative wavelengths in the whole field of view falls within ±0.06 mm. According to the distortion aberration diagram of FIG. 11D, a distortion aberration of the second embodiment is maintained within the range of ±2.5%. Therefore, it is known that compared to the existing optical lens, the second embodiment may also achieve the good optical performance under a condition that the system length is reduced to about 3.604 mm.

According to the above description, it is learned that compared to the first embodiment, the advantages of the second embodiment are that the system length of the second embodiment is shorter than the system length of the first embodiment, and the optical imaging lens of the second embodiment is easier to be fabricated compared to that of the first embodiment, so that a production yield is relatively high.

Figure 14:
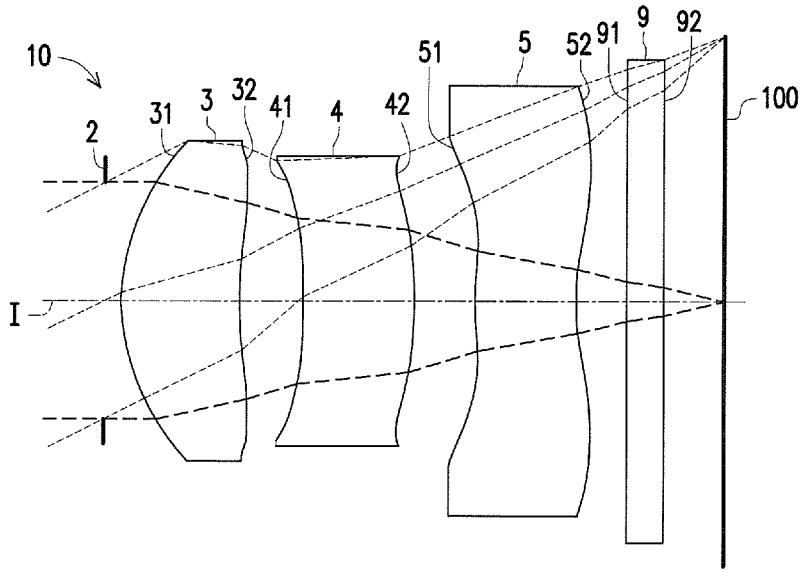
FIG. 14 is a schematic diagram of an optical imaging lens of a third embodiment of the invention.

FIG. 14 is a schematic diagram of an optical imaging lens according to a third embodiment of the invention, and FIG. 15A to FIG. 15D are diagrams illustrating longitudinal spherical aberrations and various aberrations of the optical imaging lens of the third embodiment. Referring to FIG. 14, which is a third embodiment of the optical imaging lens 10 of the invention, where the third embodiment is similar to the first embodiment, and only optical data, aspheric coefficients and parameters among the lens elements 3, 4 and 5 are somewhat different, and the second lens element 4 has positive refracting power. It should be noted that in order to clearly display the figure, a part of the referential numbers of the concave portions and the convex portions that are the same as those of the first embodiment are omitted in FIG. 14.

Detailed optical data of the optical imaging lens 10 is shown in FIG. 16, and an EFL of the whole system of the third embodiment is 2.990 mm, an HFOV thereof is 26.473°, an Fno thereof is 2.2, a system length thereof is 3.543 mm, and an image height thereof is 1.542 mm.

FIG. 17 illustrates various aspheric coefficients of the object-side surface 31 of the first lens element 3 to the image-side surface 52 of the third lens element 5 in the equation (1) in the third embodiment.

Moreover, relationships between various important parameters of the optical imaging lens 10 of the third embodiment are shown in FIG. 34.

Figures 15A, 15B, 15C, 15D:
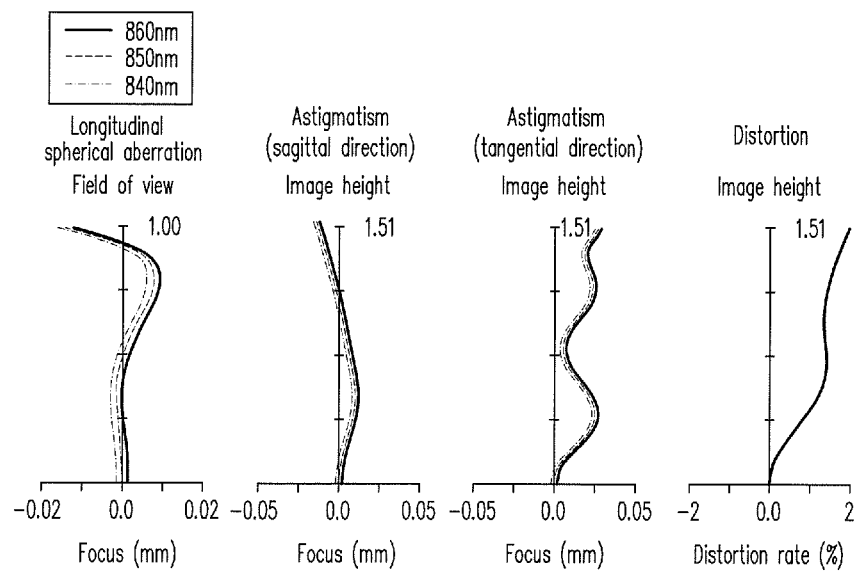
FIG. 15A-FIG. 15D are diagrams of a longitudinal spherical aberration and various aberrations of the optical imaging lens of the third embodiment.

According to the longitudinal spherical aberration diagram of FIG. 15A of the third embodiment, a deviation of the imaging points of the off-axis lights of different heights is controlled within a range of ±0.015 mm. According to the two astigmatism aberration diagrams of FIG. 15B and FIG. 15C, a focal length variation of the three representative wavelengths in the whole field of view falls within ±0.04 mm. According to the distortion aberration diagram of FIG. 15D, a distortion aberration of the third embodiment is maintained within the range of ±2%. Therefore, compared to the first embodiment, the distortion aberration of the third embodiment can be smaller under a condition that that the system length is reduced to about 3.543 mm.

According to the above description, it is learned that compared with the first embodiment, the advantages of the third embodiment are that the system length of the third embodiment is shorter than the system length of the first embodiment, and the optical imaging lens of the third embodiment is easier to be fabricated compared to that of the first embodiment, so that a production yield is relatively high.

Figure 18:
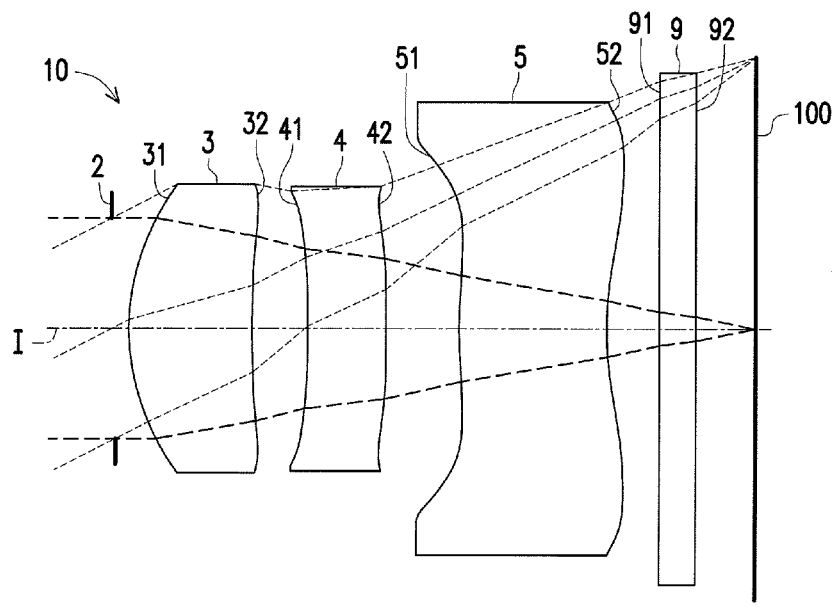
FIG. 18 is a schematic diagram of an optical imaging lens of a fourth embodiment of the invention.

FIG. 18 is a schematic diagram of an optical imaging lens according to a fourth embodiment of the invention, and FIG. 19A to FIG. 19D are diagrams illustrating longitudinal spherical aberrations and various aberrations of the optical imaging lens of the fourth embodiment. Referring to FIG. 18, which is a fourth embodiment of the optical imaging lens 10 of the invention, where the fourth embodiment is similar to the first embodiment, and only optical data, aspheric coefficients and parameters among the lens elements 3, 4 and 5 are somewhat different. It should be noted that in order to clearly display the figure, a part of the referential numbers of the concave portions and the convex portions that are the same as those of the first embodiment are omitted in FIG. 18.

Detailed optical data of the optical imaging lens 10 is shown in FIG. 20, and an EFL of the whole system of the fourth embodiment is 2.990 mm, an HFOV thereof is 27.065°, an Fno thereof is 2.4, a system length thereof is 3.564 mm, and an image height thereof is 1.542 mm.

FIG. 21 illustrates various aspheric coefficients of the object-side surface 31 of the first lens element 3 to the image-side surface 52 of the third lens element 5 in the equation (1) in the fourth embodiment.

Moreover, relationships between various important parameters of the optical imaging lens 10 of the fourth embodiment are shown in FIG. 34.

Figures 19A, 19B, 19C, 19D:
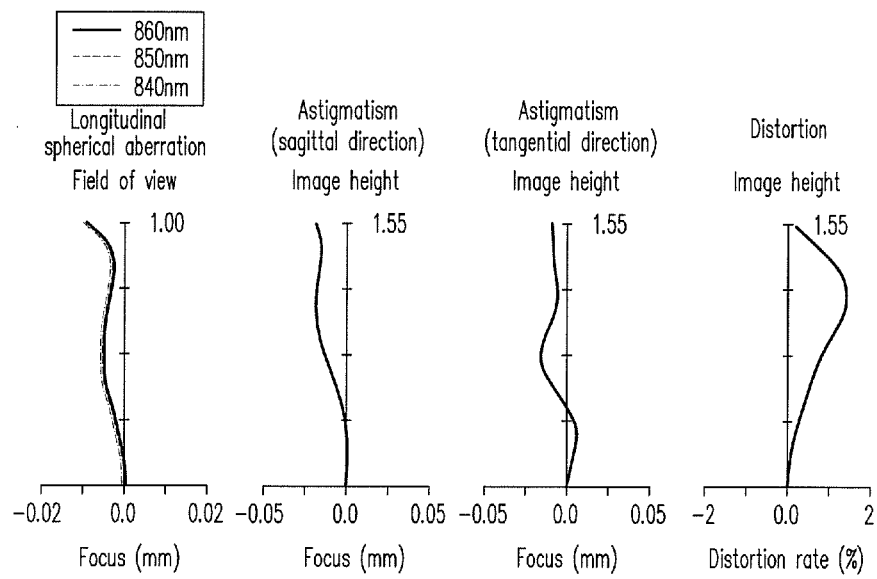
FIG. 19A-FIG. 19D are diagrams of a longitudinal spherical aberration and various aberrations of the optical imaging lens of the fourth embodiment.

According to the longitudinal spherical aberration diagram of FIG. 19A of the fourth embodiment, a deviation of the imaging points of the off-axis lights of different heights is controlled within a range of ±0.01 mm. According to the two astigmatism aberration diagrams of FIG. 19B and FIG. 19C, a focal length variation of the three representative wavelengths in the whole field of view falls within ±0.025 mm. According to the distortion aberration diagram of FIG. 19D, a distortion aberration of the fourth embodiment is maintained within the range of ±1.5%. Therefore, compared to the first embodiment, the distortion aberration of the fourth embodiment can be smaller under a condition that that the system length is reduced to about 3.564 mm.

According to the above description, it is learned that compared with the first embodiment, the advantages of the fourth embodiment are that the HFOV of the fourth embodiment is larger than the HFOV of the first embodiment, the system length of the fourth embodiment is shorter than the system length of the first embodiment, and the optical imaging lens of the fourth embodiment is easier to be fabricated compared to that of the first embodiment, so that a production yield is relatively high.

Figure 22:
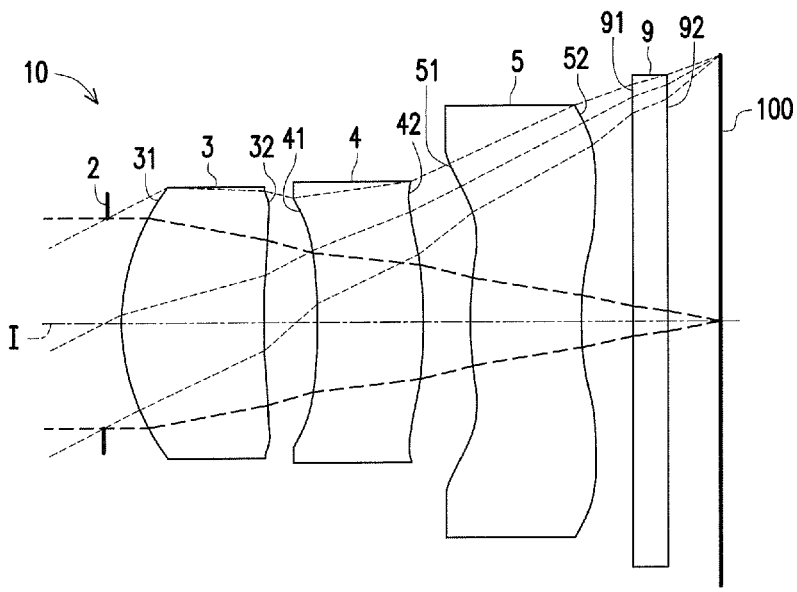
FIG. 22 is a schematic diagram of an optical imaging lens of a fifth embodiment of the invention.

FIG. 22 is a schematic diagram of an optical imaging lens according to a fifth embodiment of the invention, and FIG. 23A to FIG. 23D are diagrams illustrating longitudinal spherical aberrations and various aberrations of the optical imaging lens of the fifth embodiment. Referring to FIG. 22, which is a fifth embodiment of the optical imaging lens 10 of the invention, where the fifth embodiment is similar to the first embodiment, and only optical data, aspheric coefficients and parameters among the lens elements 3, 4 and 5 are somewhat different. It should be noted that in order to clearly display the figure, a part of the referential numbers of the concave portions and the convex portions that are the same as those of the first embodiment are omitted in FIG. 22.

Detailed optical data of the optical imaging lens 10 is shown in FIG. 24, and an EFL of the whole system of the fifth embodiment is 2.990 mm, an HFOV thereof is 26.707°, an Fno thereof is 2.5, a system length thereof is 3.508 mm, and an image height thereof is 1.542 mm.

FIG. 25 illustrates various aspheric coefficients of the object-side surface 31 of the first lens element 3 to the image-side surface 52 of the third lens element 5 in the equation (1) in the fifth embodiment.

Moreover, relationships between various important parameters of the optical imaging lens 10 of the fifth embodiment are shown in FIG. 34.

Figures 23A, 23B, 23C, 23D:
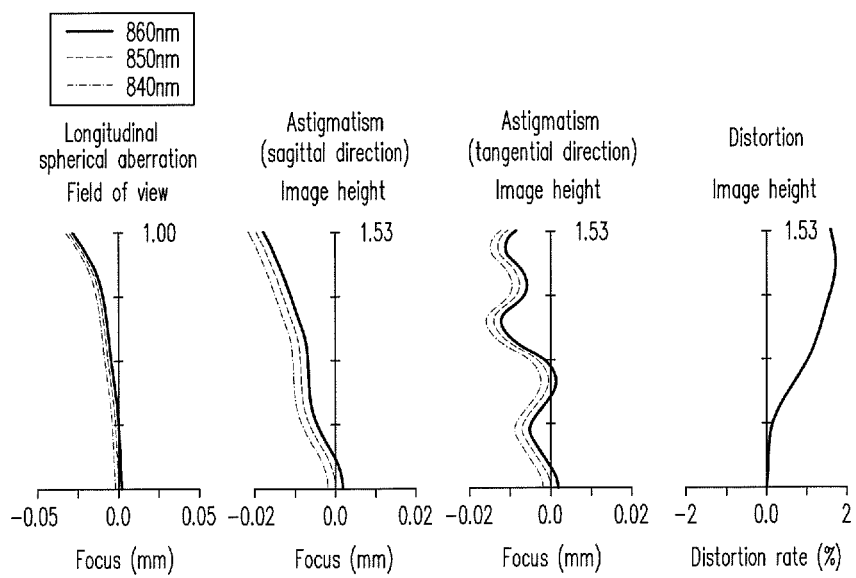
FIG. 23A-FIG. 23D are diagrams of a longitudinal spherical aberration and various aberrations of the optical imaging lens of the fifth embodiment.

According to the longitudinal spherical aberration diagram of FIG. 23A of the fifth embodiment, a deviation of the imaging points of the off-axis lights of different heights is controlled within a range of ±0.03 mm. According to the two astigmatism aberration diagrams of FIG. 23B and FIG. 23C, a focal length variation of the three representative wavelengths in the whole field of view falls within ±0.02 mm. According to the distortion aberration diagram of FIG. 23D, a distortion aberration of the fifth embodiment is maintained within the range of ±2%. Therefore, compared to the first embodiment, the distortion aberration of the fourth embodiment can be smaller under a condition that the system length is reduced to about 3.508 mm.

According to the above description, it is learned that compared with the first embodiment, the advantages of the fifth embodiment are that the system length of the fifth embodiment is shorter than the system length of the first embodiment, an image distortion of the fifth embodiment is smaller than an image distortion of the first embodiment, and the optical imaging lens of the fifth embodiment is easier to be fabricated compared to that of the first embodiment, so that a production yield is relatively high.

Figure 26:
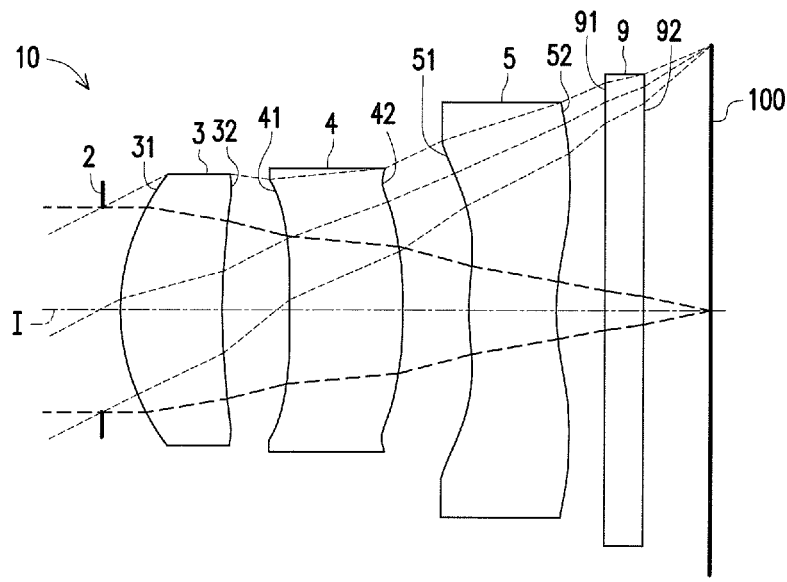
FIG. 26 is a schematic diagram of an optical imaging lens of a sixth embodiment of the invention.

FIG. 26 is a schematic diagram of an optical imaging lens according to a sixth embodiment of the invention, and FIG. 27A to FIG. 27D are diagrams illustrating longitudinal spherical aberrations and various aberrations of the optical imaging lens of the sixth embodiment. Referring to FIG. 26, which is a sixth embodiment of the optical imaging lens 10 of the invention, where the sixth embodiment is similar to the first embodiment, and only optical data, aspheric coefficients and parameters among the lens elements 3, 4 and 5 are somewhat different, and the second lens element 4 has positive refracting power. It should be noted that in order to clearly display the figure, a part of the referential numbers of the concave portions and the convex portions that are the same as those of the first embodiment are omitted in FIG. 26.

Detailed optical data of the optical imaging lens 10 is shown in FIG. 28, and an EFL of the whole system of the sixth embodiment is 2.990 mm, an HFOV thereof is 26.719°, an Fno thereof is 2.5, a system length thereof is 3.491 mm, and an image height thereof is 1.542 mm.

FIG. 29 illustrates various aspheric coefficients of the object-side surface 31 of the first lens element 3 to the image-side surface 52 of the third lens element 5 in the equation (1) in the sixth embodiment.

Moreover, relationships between various important parameters of the optical imaging lens 10 of the sixth embodiment are shown in FIG. 34.

Figures 27A, 27B, 27C, 27D:
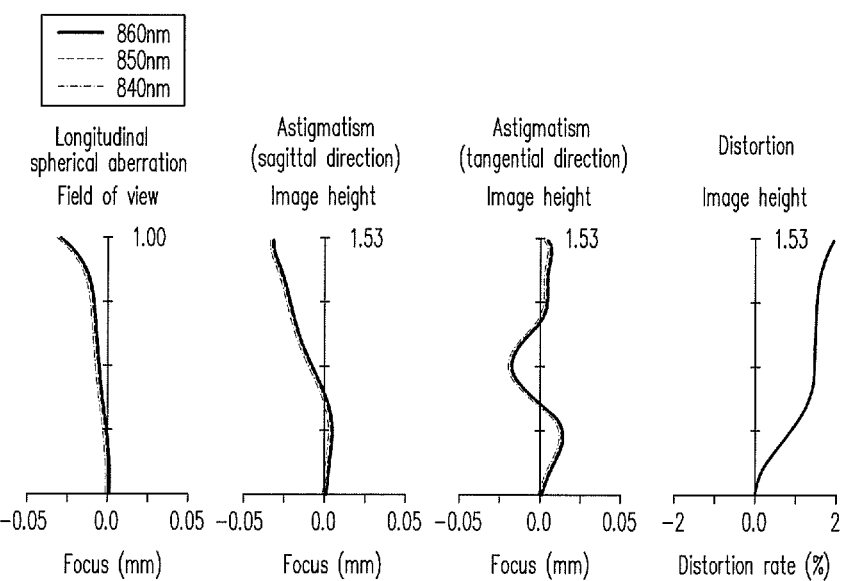
FIG. 27A-FIG. 27D are diagrams of a longitudinal spherical aberration and various aberrations of the optical imaging lens of the sixth embodiment.

According to the longitudinal spherical aberration diagram of FIG. 27A of the sixth embodiment, a deviation of the imaging points of the off-axis lights of different heights is controlled within a range of ±0.04 mm. According to the two astigmatism aberration diagrams of FIG. 27B and FIG. 27C, a focal length variation of the three representative wavelengths in the whole field of view falls within ±0.04 mm. According to the distortion aberration diagram of FIG. 27D, a distortion aberration of the sixth embodiment is maintained within the range of ±2%. Therefore, compared to the first embodiment, better imaging quality of the sixth embodiment is still provided under a condition that the system length is reduced to about 3.491 mm.

According to the above description, it is learned that compared with the first embodiment, the advantages of the sixth embodiment are that the system length of the sixth embodiment is shorter than the system length of the first embodiment, an image distortion of the sixth embodiment is smaller than an image distortion of the first embodiment, and the optical imaging lens of the sixth embodiment is easier to be fabricated compared to that of the first embodiment, so that a production yield is relatively high.

Figure 30:
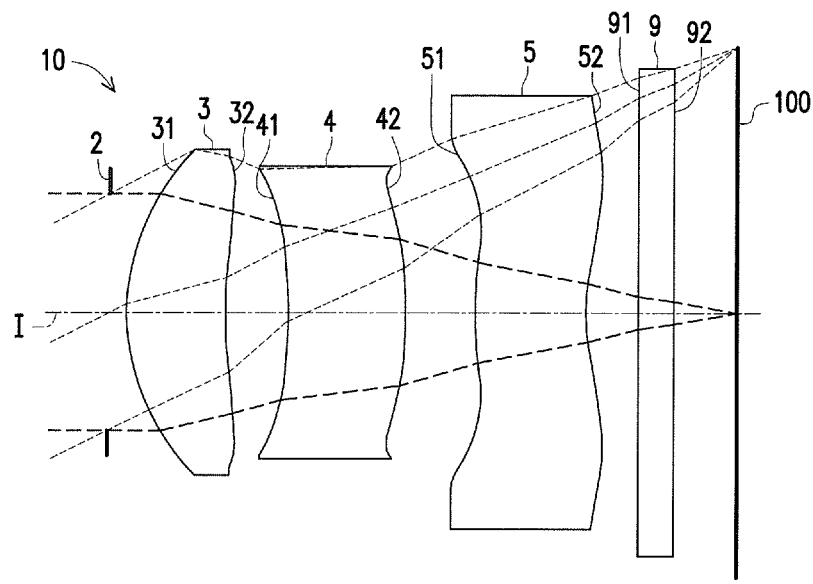
FIG. 30 is a schematic diagram of an optical imaging lens of a seventh embodiment of the invention.

FIG. 30 is a schematic diagram of an optical imaging lens according to a seventh embodiment of the invention, and FIG. 31A to FIG. 32D are diagrams illustrating longitudinal spherical aberrations and various aberrations of the optical imaging lens of the seventh embodiment. Referring to FIG. 30, which is a seventh embodiment of the optical imaging lens 10 of the invention, where the seventh embodiment is similar to the first embodiment, and only optical data, aspheric coefficients and parameters among the lens elements 3, 4 and 5 are somewhat different, and the second lens element 4 has positive refracting power. It should be noted that in order to clearly display the figure, a part of the referential numbers of the concave portions and the convex portions that are the same as those of the first embodiment are omitted in FIG. 30.

Detailed optical data of the optical imaging lens 10 is shown in FIG. 32, and an EFL of the whole system of the seventh embodiment is 2.990 mm, an HFOV thereof is 26.395°, an Fno thereof is 2.2, a system length thereof is 3.593 mm, and an image height thereof is 1.542 mm.

FIG. 33 illustrates various aspheric coefficients of the object-side surface 31 of the first lens element 3 to the image-side surface 52 of the third lens element 5 in the equation (1) in the seventh embodiment.

Moreover, relationships between various important parameters of the optical imaging lens 10 of the seventh embodiment are shown in FIG. 34.

Figures 31A, 31B, 31C, 31D:
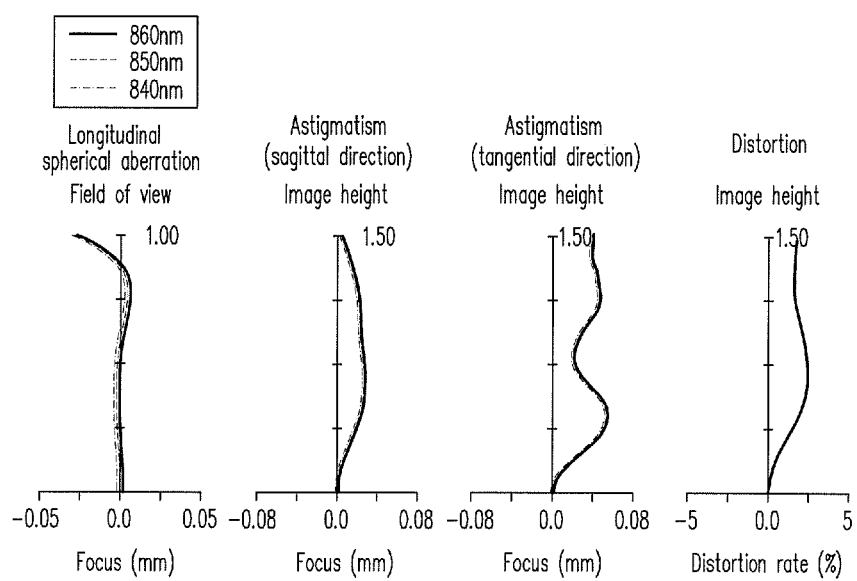
FIG. 31A-FIG. 31D are diagrams of a longitudinal spherical aberration and various aberrations of the optical imaging lens of the seventh embodiment.

According to the longitudinal spherical aberration diagram of FIG. 31A of the seventh embodiment, a deviation of the imaging points of the off-axis lights of different heights is controlled within a range of ±0.04 mm. According to the two astigmatism aberration diagrams of FIG. 31B and FIG. 31C, a focal length variation of the three representative wavelengths in the whole field of view falls within ±0.06 mm. According to the distortion aberration diagram of FIG. 31D, a distortion aberration of the seventh embodiment is maintained within the range of ±2.5%. Therefore, compared to the existing optical lens, better imaging quality of the seventh embodiment is still provided under a condition that the system length is reduced to about 3.593 mm.

According to the above description, it is learned that compared with the first embodiment, the advantages of the seventh embodiment are that the system length of the seventh embodiment is shorter than the system length of the first embodiment, and the optical imaging lens of the seventh embodiment is easier to be fabricated compared to that of the first embodiment, so that a production yield is relatively high.

Referring to FIG. 34, FIG. 34 is a table diagram of various optical parameters of the aforementioned seven embodiments, and when the various optical parameters in the optical imaging lens 10 of the invention are complied with at least one of the following conditional expressions, it assists a designer to design a technically feasible optical imaging lens with good optical performance and short overall length.

1. In order to shorten the length of the lens system, the embodiments of the invention suitably shorten a thickness of the lens elements and the air gaps among the lens elements, though considering a difficulty level of an assembling process of the lens elements and under the premise that the imaging quality has to be ensured, the thickness of the lens elements and the air gaps among the lens elements have to be suitably adjusted, so that under value limitations of satisfying the following conditional expressions, the optical imaging system may achieve better configuration:

Gaa/G2≤2.00, and preferably 1.00≤Gaa/G2≤2.00;
BFL/T2≤3.70, and preferably 1.00≤BFL/T2≤3.70;
(T1+T3)/Gaa≥1.35, and preferably 1.35≤(T1+T3)/Gaa≤3.00;
BFL/T1≤2.00, and preferably 0.50≤BFL/T1≤2.00;
(T2+G1)/G2≥1.40, and preferably 1.40≤(T2+G1)/G2≤3.00;
T3/G2≥1.25, and preferably 1.25≤T3/G2≤2.50;
(T1+T3)/G2≥2.70, and preferably 2.70≤(T1+T3)/G2≤5.50;
T2/G2≥1.00, and preferably 1.00≤T2/G2≤2.00;
TL/Gaa≥3.20, and preferably 3.20≤TL/Gaa≤4.50;
(T1+T3)/G1≥2.70, and preferably 2.70≤(T1+T3)/G1≤9.50;
ALT/Gaa≥2.20, and preferably 2.20≤ALT/Gaa≤3.50;
TL/T2≤6.00, and preferably 3.50≤TL/T2≤6.00;
T1/G2≥1.30, and preferably 1.30≤T1/G2≤3.00;
(G1+T1)/T2≤2.20, and preferably 1.00≤(G1+T1)/T2≤2.20;
(T2+T1)/Gaa≥1.55, and preferably 1.55≤(T2+T1)/Gaa≤2.50;
(T2+T1)/G2≥2.5, and preferably 2.50≤(T2+T1)/G2≤5.00.

2. Reduction of the EFL of the optical imaging lens 10 avails expanding the FOV, so that the EFL of the optical imaging lens 10 is designed to be smaller, and if the following conditional expression is satisfied, it avails expanding the FOV when the thickness of the optical system is thinned:

$$EFL/(T2+G2) \leq 3.40, \text{ and preferably } 2.50 \leq EFL/(T2+G2) \leq 3.40.$$

3. When the following conditional expression is satisfied, clarity of partial imaging of the object is effectively strengthened, and aberration of the partial imaging of the object is effectively corrected:

$$\upsilon 1 \leq 35.$$

4. When the optical imaging lens of the embodiments of the invention satisfies any one of the following conditional expressions, it represents that when the denominator is not changed, a length of the numerator can be shortened to reach an effect of decreasing a lens volume: Gaa/G2≤2.00; BFL/T2≤3.70; BFL/T1≤2.00; TL/T2≤6.00; (G1+T1)/T2≤2.20. If any of the following conditional expressions is further satisfied, better imaging quality is achieved: 1.00≤Gaa/G2≤2.00; 1.00≤BFL/T2≤3.70; 0.50≤BFL/T1≤2.00; 3.50≤TL/T2≤6.00; 1.00≤(G1+T1)/T2≤2.20.

5. When the optical imaging lens satisfies any one of the following conditional expressions, it represents that the optical imaging lens has a better configuration, and has good imaging quality under a premise of maintaining a proper yield: (T1+T3)/Gaa≥1.35; (T2+G1)/G2≥1.40; T3/G2≥1.25; (T1+T3)/G2≥2.70; T2/G2≥1.00; TL/Gaa≥3.20; (T1+T3)/G1≥2.70; ALT/Gaa≥2.20; T1/G2≥1.30; (T2+T1)/Gaa≥1.55; (T2+T1)/G2≥2.50. When the optical imaging lens further satisfies any one of the following conditional expressions, it represents that the optical imaging lens may further maintain a proper volume: 1.35≤(T1+T3)/Gaa≤3.00; 1.40≤(T2+G1)/G2≤3.00; 1.25≤T3/G2≤2.50; 2.70≤(T1+T3)/G2≤5.50; 1.00≤T2/G2≤2.00; 3.20≤TL/Gaa≤4.50; 2.70≤(T1+T3)/G1≤9.50; 2.20≤ALT/Gaa≤3.50; 1.30≤T1/G2≤3.00; 1.55≤(T2+T1)/Gaa≤2.50; 2.50≤(T2+T1)/G2≤5.00.

However, due to unpredictability of optical system design, under the architectures of the embodiments of the invention, to comply with the aforementioned conditional expressions may effectively shorten the lens length of the optical imaging lens according to the embodiments of the invention, enlarge the applicable aperture thereof, increase the FOV thereof, enhance the imaging quality thereof or the assembling yield thereof to mitigate the disadvantages of the prior art.

In summary, the optical imaging lens 10 of the embodiments of the invention may have following effects and advantages:

1. The longitudinal spherical aberrations, astigmatism aberrations and distortion aberrations of the embodiments of the invention are all complied with usage specifications. Moreover, the off-axis lights of different heights of the three representative wavelengths 860 nm, 850 nm and 840 nm are all gathered around imaging points, and according to a deviation range of each curve, it is learned that deviations of the imaging points of the off-axis lights of different heights are all controlled to achieve good suppressing effect of spherical aberration, astigmatism aberration and distortion aberration. Referring to the imaging quality data, distances among the three representative wavelengths 860 nm, 850 nm and 840 nm are rather close, which represents that the optical imaging lens 10 of the embodiments of the invention have good a concentration effect for the lights of different wavelengths under different states, and has good dispersion suppressing capability, so that it is learned that the optical imaging lens 10 of the embodiments of the invention have good optical performance. The optical imaging lens 10 of the embodiments of the invention may serve as a night vision camera or a pupil recognition lens for infrared light imaging, and according to the aforementioned description, it is known that the imaging effect of the infrared light imaging is good.

2. The negative refracting power of the third lens 5 avails eliminating aberration.

3. The concave portion 321 in a vicinity of the optical axis 1 and the convex portion 322 in a vicinity of a periphery on the image-side surface 32 of the first lens 3 may assist collecting the imaging ray; the image-side surface 42 of the second lens element 4 has the convex portion 421 in a vicinity of the optical axis I and the concave portion 422 in a vicinity of a periphery of the second lens element 4, and the object-side surface 51 of the third lens element 5 has the concave portion 512 in a vicinity of a periphery of the third lens element 5, and the aforementioned portions work together to achieve an aberration correcting effect, in which the image-side surface 42 of the second lens element 4 having the concave portion 422 in a vicinity of a periphery of the second lens element 4 avails effectively correcting aberration of partial imaging of the object.

4. Through mutual collaboration of the aforementioned design, the lens length can be effectively shortened while maintaining the imaging quality, and the clarity of partial imaging of the object is strengthened.

Figure 35:
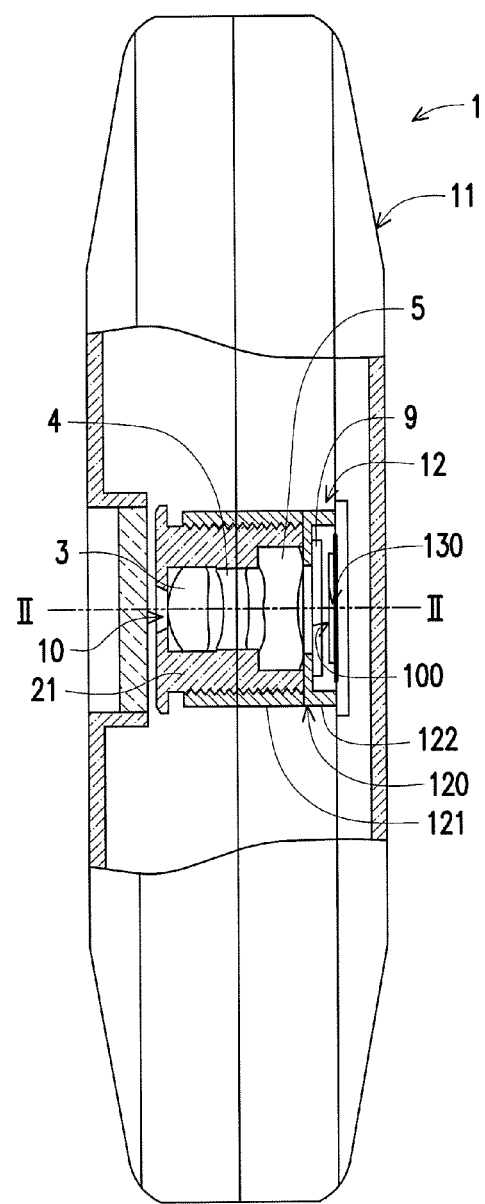
FIG. 35 is a cross-sectional view of a first embodiment of an electronic device of the invention.

Referring to FIG. 35, which is a first embodiment of a mobile device 1 applying the aforementioned optical imaging lens 10. The mobile device 1 includes a casing 11 and an image module 12 installed in the casing 11. In the present embodiment, the mobile device 1 implemented by a mobile phone is taken as an example for description, though the type of the mobile device 1 is not limited thereto.

The image module 12 includes the aforementioned optical imaging lens 10, a lens barrel 21 used for accommodating the optical imaging lens 10, a module holder unit 120 used for holding the lens barrel 21, and an image sensor 130 disposed at the image side of the optical imaging lens 10. The image plane 100 is foil led at the image sensor 130.

The module holder unit 120 has a lens holder 121 and an image sensor holder 122 disposed between the lens holder 121 and the image sensor 130. The lens barrel 21 and the lens holder 121 are disposed coaxially along an axial line II, and the lens barrel 21 is disposed at an inner side the lens holder 121.

Figure 36:
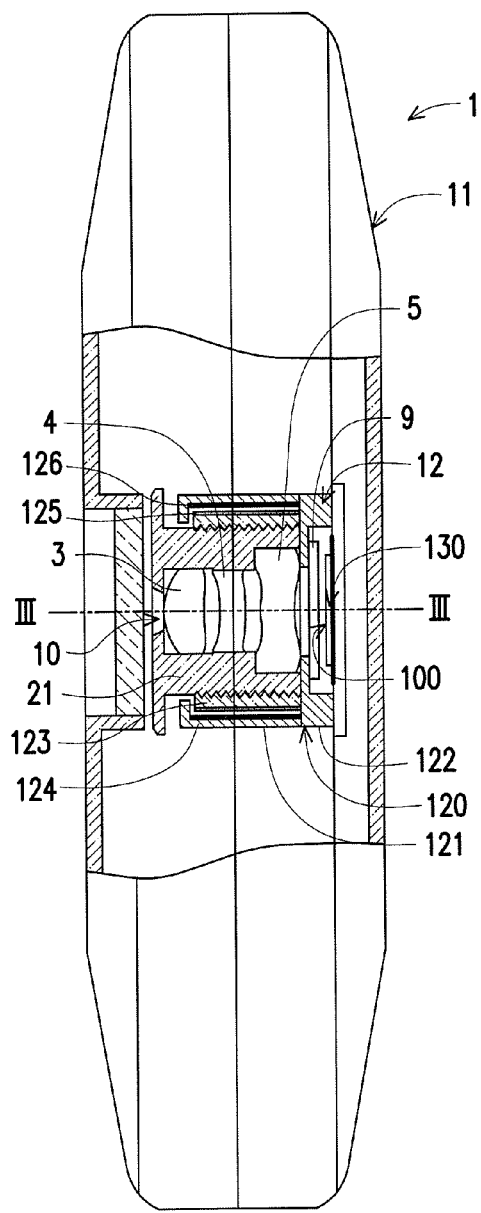
FIG. 36 is a cross-sectional view of a second embodiment of an electronic device of the invention.

Referring to FIG. 36, which is a second embodiment of the mobile device 1 applying the aforementioned optical imaging lens 10, and a main difference between the mobile devices 1 of the second embodiment and the first embodiment is that the module holder unit 120 is a voice coil motor (VCM) type. The lens holder 121 has a first holder body 123 attached to an outer side of the lens barrel 21 and disposed along an axial line III, a second holder body 124 disposed by surrounding the outer side of the first holder body 123 along the axial line III, a coil 125 disposed between the outer side of the first holder body 123 and an inner side of the second holder 124 body, and a magnetic element 126 disposed between the outer side of the coil 125 and the inner side of the second holder body 124.

The first holder body 123 of the lens holder 121 may drive the lens barrel 21 and the optical imaging lens 10 disposed in the lens barrel 21 to move along the axial line III. The image sensor holder 122 is attached to the second holder body 124. The light filter 9 is disposed at the image sensor holder 122. Other component structures of the mobile device 1 of the second embodiment are similar to that of the mobile device 1 of the first embodiment, and detail thereof is not repeated.

By installing the optical imaging lens 10, since the system length of the optical imaging lens 10 can be effectively shortened, the thickness of the mobile devices 1 of the first embodiment and the second embodiment can all be reduced to manufacture a thinner product, and good optical performance and imaging quality can still be provided. In this way, besides that a material usage amount of the casing of the mobile device according to the embodiments of the invention is decreased to achieve good economic benefit, the product design trends of light, slim, short and small and consumer demands are satisfied.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical imaging lens, comprising:
a first lens element, a second lens element and a third lens element arranged in a sequence from an object side to an image side along an optical axis, wherein each of the first lens element to the third lens element has an object-side surface facing the object side and pervious to an imaging ray and an image-side surface facing the image side and pervious to the imaging ray;
wherein the image-side surface of the first lens element has a concave portion in a vicinity of the optical axis and a convex portion in a vicinity of a periphery;
the image-side surface of the second lens element has a convex portion in a vicinity of the optical axis and a concave portion in a vicinity of a periphery; and the third lens element has a negative refracting power, and
the object-side surface of the third lens element has a concave portion in a vicinity of a periphery,
wherein the number of lens elements of the optical imaging lens having refracting power is only three, and the optical imaging lens is complied with:

$Gaa/G2 \leq 2$; and $EFL/(T2+G2) \leq 3.40$, wherein Gaa is a sum of two air gaps on the optical axis from the first lens element to the third lens element, G2 is an air gap on the optical axis from the second lens element to the third lens element, EFL is an effective focal length of the optical imaging lens, and T2 is a thickness of the second lens element on the optical axis.

2. The optical imaging lens as claimed in claim 1, wherein the optical imaging lens is further complied with: $BFL/T2 \leq 3.70$, wherein BFL is a distance between the image-side surface of the third lens element and an image plane of the optical imaging lens on the optical axis.

3. The optical imaging lens as claimed in claim 2, wherein the optical imaging lens is further complied with: $(T1+T3)/Gaa \geq 1.35$, wherein T1 is a thickness of the first lens element on the optical axis, and T3 is a thickness of the third lens element on the optical axis.

4. The optical imaging lens as claimed in claim 1, wherein the optical imaging lens is further complied with: $BFL/T1 \leq 2.00$, wherein BFL is a distance between the image-side surface of the third lens element and the image plane of the optical imaging lens on the optical axis, and T1 is a thickness of the first lens element on the optical axis.

5. The optical imaging lens as claimed in claim 1, wherein the optical imaging lens is further complied with: $(T2+G1)/G2 \geq 1.40$, wherein G1 is an air gap between the first lens element and the second lens element on the optical axis.

6. The optical imaging lens as claimed in claim 5, wherein the optical imaging lens is further complied with: $T3/G2 \geq 1.25$, wherein T3 is a thickness of the third lens element on the optical axis.

7. The optical imaging lens as claimed in claim 1, wherein the optical imaging lens is further complied with: $(T1+T3)/Gaa \geq 1.35$, wherein T1 is a thickness of the first lens element on the optical axis, and T3 is a thickness of the third lens element on the optical axis.

8. The optical imaging lens as claimed in claim 1, wherein the optical imaging lens is further complied with: $T3/G2 \geq 1.25$, wherein T3 is a thickness of the third lens element on the optical axis.

9. The optical imaging lens as claimed in claim 1, wherein the optical imaging lens is further complied with: $(T1+T3)/G2 \geq 2.70$, wherein T1 is a thickness of the first lens element on the optical axis, and T3 is a thickness of the third lens element on the optical axis.

10. The optical imaging lens as claimed in claim 1, wherein the optical imaging lens is further complied with: $T2/G2 \geq 1.00$.

11. The optical imaging lens as claimed in claim 10, wherein the optical imaging lens is further complied with: $TL/Gaa \geq 3.20$, wherein TL is a distance between the object-side surface of the first lens element and the image-side surface of the third lens element on the optical axis.

12. The optical imaging lens as claimed in claim 1, wherein the optical imaging lens is further complied with: $(T1+T3)/G1 \geq 2.70$, wherein T1 is a thickness of the first lens element on the optical axis, T3 is a thickness of the third lens element on the optical axis, and G1 is an air gap between the first lens element and the second lens element on the optical axis.

13. The optical imaging lens as claimed in claim 12, wherein the optical imaging lens is further complied with: $ALT/Gaa \geq 2.20$, wherein ALT is a sum of the thickness of the first lens element, the second lens element and the third lens element on the optical axis.

14. The optical imaging lens as claimed in claim 1, wherein the optical imaging lens is further complied with: $TL/T2 \leq 6.00$, wherein TL is a distance between the object-side surface of the first lens element and the image-side surface of the third lens element on the optical axis.

15. The optical imaging lens as claimed in claim 14, wherein the optical imaging lens is further complied with: $ALT/Gaa \geq 2.20$, wherein ALT is a sum of thicknesses of the first lens element, the second lens element and the third lens element on the optical axis.

16. The optical imaging lens as claimed in claim 1, wherein the optical imaging lens is further complied with: $T1/G2 \geq 1.30$, wherein T1 is a thickness of the first lens element on the optical axis.

17. The optical imaging lens as claimed in claim 1, wherein the optical imaging lens is further complied with: $(G1+T1)/T2 \leq 2.20$, wherein G1 is an air gap between the first lens element and the second lens element on the optical axis, and T1 is a thickness of the first lens element on the optical axis.

18. The optical imaging lens as claimed in claim 17, wherein the optical imaging lens is further complied with: $(T2+T1)/Gaa \geq 1.55$.

19. The optical imaging lens as claimed in claim 1, wherein the optical imaging lens is further complied with: $(T2+T1)/G2 \geq 2.50$, wherein T1 is a thickness of the first lens element on the optical axis.

20. A mobile device, comprising:
a casing; and
an image module, installed in the casing, and comprising:
the optical imaging lens as claimed in claim 1;
a lens barrel, accommodating the optical imaging lens;
a module holder unit, holding the lens barrel; and
an image sensor, disposed at the image side of the optical imaging lens.

* * * * *